March 24, 1936.    W. R. WEEKS    2,035,035
CONTROL SWITCH FOR ELECTRIC APPLIANCES
Filed Feb. 2, 1933    3 Sheets-Sheet 3

Inventor
Walter R. Weeks,
By Rockwell & Bartholow
Attorneys

Patented Mar. 24, 1936

2,035,035

UNITED STATES PATENT OFFICE 2,035,035

CONTROL SWITCHES FOR ELECTRIC APPLIANCES

Walter R. Weeks, Hamden, Conn., assignor to The Seamless Rubber Company, Incorporated, New Haven, Conn., a corporation of Massachusetts Application February 2, 1933, Serial No. 654,808

46 Claims. (Cl. 200—122)

This invention relates to control switches for electrical appliances, and it has particular reference to a device for providing automatic control of the temperature of electric heating pads and similar appliances.

One of the objects of my invention is to provide an effective device for automatically controlling the electrical input to an electric heating pad or other electrical appliance so that the latter will maintain the desired temperature.

Another object is to furnish a control switch of relatively small compass adapted to be interposed in the conductor cord of an electric heating pad or the like to replace any of the well known types of rheostats now commonly used for temperature control, and which will give a nicer and more satisfactory control of temperature than has heretofore been possible.

Another object is to furnish an improved control switch which reduces waste of current to a minimum.

To these and other ends the invention consists in the novel features and combinations of parts to be hereinafter described and claimed.

In the embodiment of my invention which I have selected for illustration and detailed description, the control switch embodies an elongated generally rectangular case of small compass constructed of molded insulating material and made in two sections adapted to be secured together by screws or the like and containing a switch device and thermostatic mechanism to which a conductor cord, passing into the casing at the respective ends, is connected. The conductor cord, which is the usual duplex cord, enters the switch casing at one end and has its respective conductors secured to terminals at one end of the switch, and similarly, the individual conductors at the opposite end of the switch are secured to two other terminals. Connecting a terminal at one end of the switch with a corresponding terminal at the opposite end is a through conductor member in one leg of the circuit which may be constituted by a conductor bar or a fuse member, as desired. Interposed between the other terminal at the first end of the switch and its corresponding terminal at the opposite end is a thermostatic control device and switch, including a conductor strip connected to one terminal, a thermostat blade adapted to be electrically connected with the other terminal by a snap-action contact device, a heating coil which influences the thermostat blade, and a manually operable controlling slide cooperating with the conductor strip above mentioned and with the heating coil in a manner to be hereinafter more particularly described. The arrangement is such that when the slide is in one position the circuit is open, and that in a large number of positions to which the slide can be moved along the conductor strip, the circuit will be closed, but with a variable heating up of the coil and a variable effect upon the thermostat blade, depending upon the position to which the slide is moved in a slot with which the casing is provided.

In the drawings, the upper section of the casing is indicated at A, the lower section at B, the screws by which the sections are secured together at C, the terminals at one end of the device at D and E, respectively, the terminals at the opposite end, at F and G, respectively, the fusible conductor strip connecting terminals D and F, at H, the switch and thermostat control device between terminals E and G, at I, and the controlling slide at J.

Figure 1:
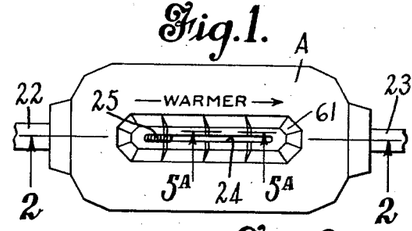
Fig. 1 is a top plan view of a control switch constructed in accordance with my invention.
Figure 2:
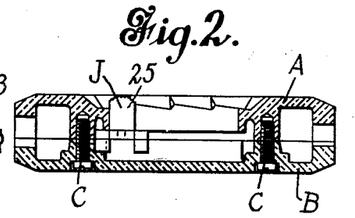
Fig. 2 is a section on line 2—2 of Fig. 1 with the incoming and outgoing parts of the conductor cord omitted.

The sections A and B are preferably made of a phenol condensation product or other suitable insulating material molded in the usual manner, and the casing is of generally rectangular shape having hollow projections 20, 21 which receive those parts of the conductor cord which enter the casing. The individual conductors of the duplex conductor cord 22 entering the casing at the left-hand end (Fig. 1) may be assumed to be connected with the heating coil of the heating pad or like device, and these conductors are connected to the terminals D and E. At the opposite end of the switch casing the duplex conductor 23, which may be assumed to lead from an ordinary attachment plug adapted to fit a light socket, has its individual conductors attached to the terminals F and G, respectively. A fusible wire may be substituted for the strip H, if this be desired. The terminals D, E, F, G are all preferably secured in and carried by the upper section A of the casing, and the switch and thermostat mechanism I, as well as the conductor strip H, is carried by this section of the casing. The lower section B is shown in detail in Fig. 14, and in effect forms a removable bottom for the casing. The bottom except for the screw holes is imperforate, but the upper section A is provided substantially in its longitudinal median line with a slot 24 through which projects a tongue 25 by means of which the slide member J is manipulated. The slot 24 is located between the conductor strip H at one side of the switch and the thermostatic device I at the opposite side of the switch.

Figure 3:
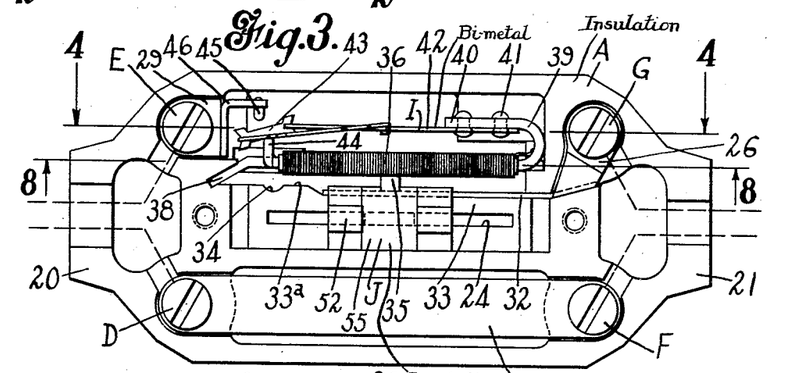
Fig. 3 is an enlarged plan view of the upper section of the switch looking from beneath.

The terminals D, E, F, G preferably comprise, as shown, screws having grooved heads cooperating with metallic plate members having interiorly threaded bushings with which the shanks of the screws engage. As shown particularly in Fig. 4, for example, terminal G comprises a plate portion 26 to which is secured an interiorly threaded metallic bushing 27 in which the threaded shank of the terminal screw 28 engages, the bushing 27 being located in a correspondingly shaped socket formed in casing section A. Terminal E is somewhat similarly constituted in that it comprises a metallic plate portion 29 to which is secured a bushing 30 socketed in the casing and engaged by a terminal screw 31. The terminals D and F preferably comprise screws engaging bushings similar to the bushings 27 and 30 and similarly socketed in the casing. The contact plate 26 of terminal G is extended (preferably integrally) to form a conductor strip 32, which is located in parallelism to the slot 24 and at one side of said slot. The strip 32 is preferably arranged so that it abuts flatwise against the wall 33 of the insulating material of the case, which wall 33 at one face engages strip 32 and at the opposite face forms a boundary for slot 24. The slide member J previously mentioned is arranged to slide along the strip 32 in contact therewith. The strip 32 does not extend throughout the length of slot 24 but terminates short of the left-hand end of the latter, as shown in Fig. 3, and along the portion of wall 33, over which the strip 32 does not extend, said wall is thickened so that its outer surface, as indicated at 33ª in Fig. 3, is substantially flush with the outer surface of the strip 32. This wall portion is also provided with a notch 34, the purpose of which will hereinafter appear.

Figure 4:
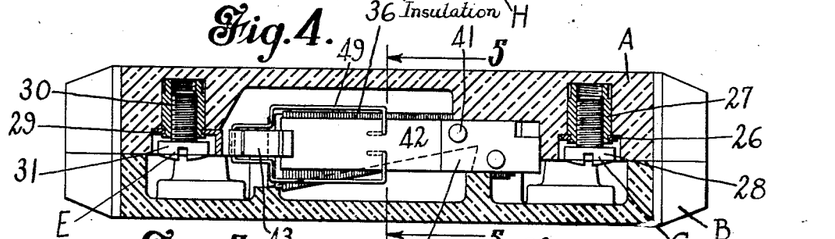
Fig. 4 is a section on line 4—4 of Fig. 3.
Figure 9:
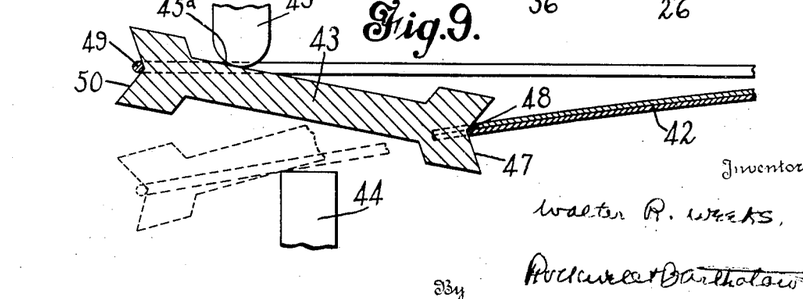
Fig. 9 is a detail on a greatly enlarged scale of the snap-action contact mechanism.
Figure 10:
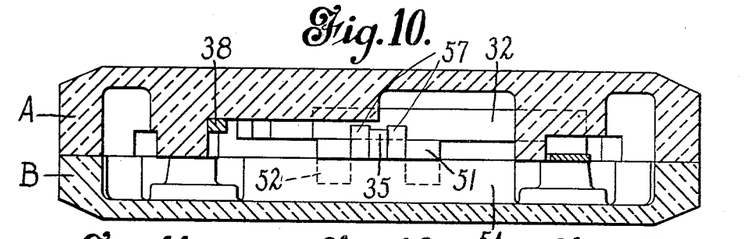
Fig. 10 is a section similar to Fig. 7 but showing the slide member in an intermediate position.

The slide member J carries intermediate of its ends a metallic contact finger 35, which is adapted to make contact with and slide along a resistance coil 36. This coil has a metallic core 37 formed of a metal plate extending parallel to slot 24 throughout a portion of its length. The plate forming the core of the coil has one of its side faces set so as to oppose one face of the conductor strip 32. One end of the core 37 extends beyond the coil 36 and has a slanting or inclined extremity 38 fitting a notch in the casing in such a manner as to anchor the core in place. At its opposite end, also, the core is extended beyond the coil, and where it extends beyond the coil it is reversely turned, as shown at 39 in Fig. 3, so that a portion 40 thereof lies substantially opposite and parallel to one end portion of the coil 36. To this portion 40 is suitably secured as by rivets 41 a bi-metal thermostat bar or blade 42, which also extends in approximate parallelism to the resistance coil. Carried by the thermostat blade 42 and located at the end thereof is a swinging metallic contact piece 43 which cooperates with a fixed stop 44 projecting laterally from core 37 and with a contact projection 45 carried by a bracket 46 extending from plate 29 of terminal E. In one position the swinging contact member 43 engages stop 44, and in the other position it engages contact 45. Swinging contact 43 may be mounted on the thermostat blade in any of a number of ways, but in the preferred form the rear end of contact member 43 has a V-shaped recess 47, which is engaged by a knife edge 48 at the end of the thermostat blade, and a wire bail member 49 mounted on the blade engages a V-shaped recess 50 at the opposite end of the swinging contact 43. The wire bail member 49 is made of fine wire and at its rear end it is secured to the thermostat blade in a suitable manner as by having its ends drawn in through small holes in the blade and then bent laterally, as indicated in Fig. 4. At its outer end the bail is reduced in width and has a portion running across and engaged in the V-shaped recess 50. The normal position of the bail member is to one side or the other of the outer end portion of the thermostat blade. When the contact member or leaf 43 is in a position where it is in substantial alinement with the end of the thermostat blade, the bail 49 is placed under tension and it exerts a spring action tending to throw the contact leaf to one side or the other of the thermostat blade. The contact projection 45 is of approximately the same width as the contact leaf 43, and has a rounded end portion 45ª which is contacted by one of the side faces of the leaf when the parts are in the position shown in Fig. 9.

Figure 8:
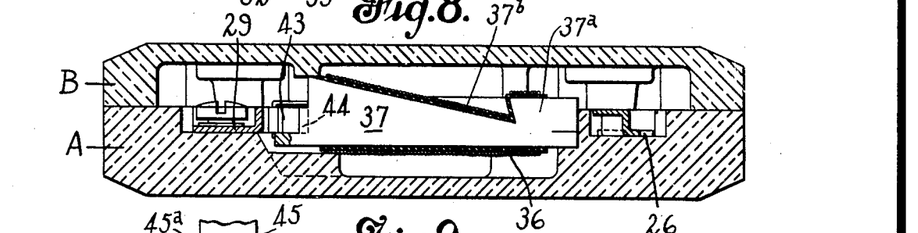
Fig. 8 is a section on line 8—8 of Fig. 3.

For reasons hereinafter mentioned the metallic core 37 of the heating coil is not of uniform cross-section throughout its length, but is tapered so as to decrease in mass toward that end of the core to which the thermostat blade is connected. This is shown particularly in Fig. 8, from which it will be observed that the upper and lower edges of the core converge toward the right-hand end of the core. Preferably, however, the core is widened again, as shown at 37ª, in that portion which supports the last few turns of the coil. The portion 37ª of the core which supports the last few turns of wire is preferably of the same width as the reversely turned portion 39, previously mentioned, to which the thermostat blade is secured. The coil is insulated from the core in any appropriate manner, but preferably by interposing a layer of asbestos paper 37ᵇ between the core and the windings of wire. That portion of the coil which is toward the left of Fig. 8 is free from connection with the core and insulated therefrom, but at the opposite end of the coil the latter is electrically connected with the core. In the particular form shown the last turn of the coil located toward the right of Fig. 8 is soldered or otherwise secured to the core, as indicated at 37ᶜ in Fig. 6.

Figures 11, 12:
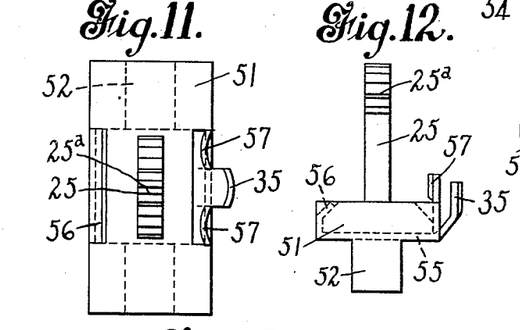
Fig. 11 is a detail top plan view of the slide member which controls the flow of current through the heating coil.
Fig. 12 is an end view of said slide member.
Figure 13:
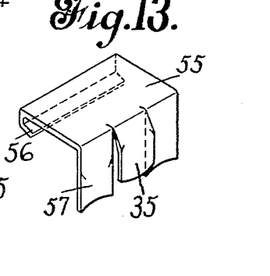
Fig. 13 is a detail perspective view of the metallic plate carried by the slide member.

Reference has previously been made to the tongue or projection 25 on slide member J projecting upward through slot 24 to provide for the manual manipulation of the slide member. The tongue 25 is preferably curved at its outer end and provided with a plurality of serrations, as shown at 25ᵃ, so that it can be readily manipulated by the thumb of the user. This tongue is preferably formed as an integral part of a body 51 formed of molded insulating material. The detailed construction of the slide member is shown particularly in Figs. 11, 12, and 13, and it will be seen that the body 51 is in the form of a rectangular plate, from the upper surface of which the tongue 25 rises as an integral projection at a point midway of the length of the plate, while from the lower surface of the plate at the respective ends thereof depend integral lugs 52 which engage a groove 53 formed between ribs 54 projecting upward from the bottom section B of the casing. It will, therefore, be seen that the lugs 52 assist in guiding the slide member in a direction lengthwise of the casing and prevent the canting of the tongue 25 in its slot 24. Around the middle portion of the body of the slide member is bent a metallic plate 55, shown in detail in Fig. 13. One margin 56 of plate 55 is bent around one of the side margins of plate portion 51 so as to be held thereto. At the opposite side of plate 55 the tongue 35, previously mentioned, is bent up, and as the slide member is slid back and forth in its slot the tongue 35 engages and makes contact with the turns of the coil 36. At the sides of the tongue 35 are tongue portions 57 located somewhat out of line with tongue 35 and adapted to engage the outer face of the conductor strip 32, as shown more particularly in Fig. 5. As will be seen in Fig. 12, the tongues 57 project upward beyond the upper face of the body of the slide member and they are thus in a position to engage and slide along the lower marginal portion of strip 32.

Figure 6:
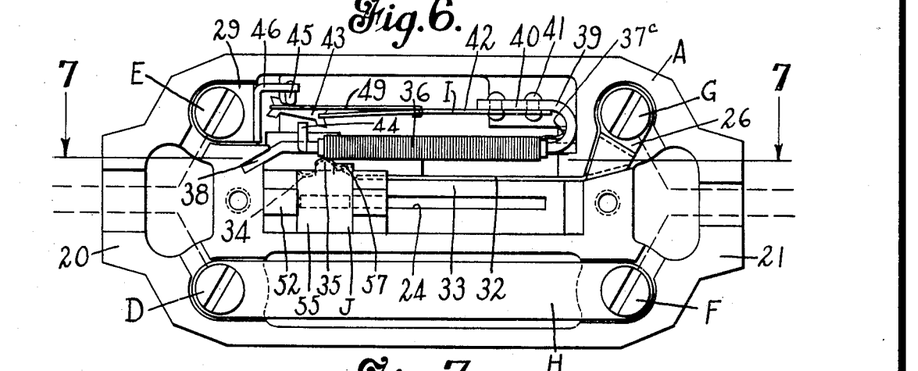
Fig. 6 is a view similar to Fig. 3 but showing the switch in the off position.
Figure 7:
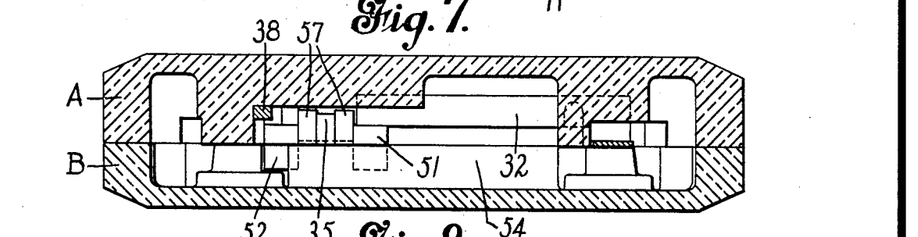
Fig. 7 is a section on line 7—7 of Fig. 6.

When the slide member is moved to the extreme left-hand position shown in Fig. 6, one of the tongues 57 engages the casing notch 34, previously described, and in this manner the slide is effectively held in the off position. This off position is preferably such that while the tongue 35 continues to engage the side face of the heating coil, the other of the tongues 57 is out of engagement with the conductor strip 32. In this position of the parts no current will pass through the switch, as there will be a gap in that portion of the circuit located between the terminals E and G, and, more particularly, between the conductor strip 32 associated with terminal G and the metallic current-carrying plate member on the slide that is in electrical connection with the coil 36.

Figures 14, 15:
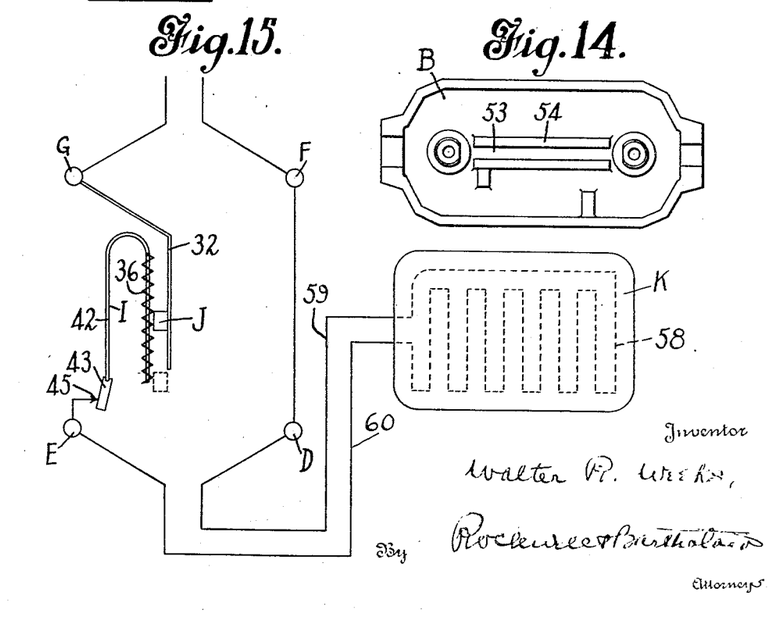
Fig. 14 is a detail view on a smaller scale of the bottom section of the case.
Fig. 15 is a diagram showing the electrical connections in the control switch and between the latter and the heating pad or like appliance.

By moving the slide member J somewhat to the right from the position shown in Fig. 6, the metallic current-carrying part of the slide is moved into contact with the end of the conductor strip 32 so as to complete the circuit. In this position of the parts electric current reaching terminal G from a suitable source, as from an electric light socket, passes through conductor strip 32, contact plate 55, tongue 35, through that portion of the coil 36 which is to the right (Fig. 3) of tongue 35, thence to core portion 39, through thermostat blade 42, contact leaf 43, fixed contact 45, terminal E, and thence to the heating pad or other device the temperature of which is being controlled. Fig. 15 shows in a diagrammatic manner how the control switch is connected to a heating pad, and in this view the heating pad is indicated diagrammatically at K, having a plurality of convolutions 58 of heating resistance in circuit with leads 59, 60 connected with the terminals D and E, respectively. In this view the off position of the slide member J is shown in dotted lines. When the slide member is moved to the on position, as just described, the circuit is completed through the switch device and heating pad, as the contact 43 is normally held in a position in which it makes contact with the stationary contact 45.

When the slide member J is moved from the off position to a position in which its contact plate is in electrical connection with the extreme end of the conductor strip 32, the heating pad or other appliance will be maintained at its lowest temperature. When the parts are in the position stated the current passing to the heating pad will pass through substantially the entire heating coil 36, because in the position referred to the tongue 35 makes contact with the left-hand end of the heating coil. The coil will be heated by the current passing through it and will transmit the greater part of the heat to the core 37 and through the core largely by conduction to the thermostat blade 42. The heat causes the thermostat blade to flex and its end to move in a direction toward the stationary contact 45. This brings the contact leaf 43 and the thermostat blade into line with each other, and when the parts take this position the action of the bail 49 is such as to force the leaf 43 toward the other side of the thermostat blade. As a consequence the contact leaf 43 is moved away from stationary contact 45 and snaps over against the projection or abutment 44, as indicated by the dotted lines in Fig. 9. As a consequence of the leaf 43 moving away from stationary contact 45, the circuit is interrupted. The heating coil, core and thermostat blade now cool, and as the blade cools its end moves toward the abutment or stop 44, forcing the contact leaf 43, which is pressing against this stop, to again come into line with the thermostat blade, and then to be forced back with a snap action against the stationary contact 45. This closes the circuit again. The heating coil is again heated by the current and the cycle is repeated.

When the entire heating coil 36 is connected in the circuit, the temperature of the coil, core and thermostat blade rises rapidly, causing the blade to deflect and to open the circuit at the contacts 43, 45 after a short interval of time. Then, with the current shut off, the coil, core and blade cool slowly, causing the circuit to be reclosed after a considerable lapse of time. Thus when the slide is in the location next to the off position, the heating pad or other appliance will receive electrical energy only during a relatively short period of time. If the slide is moved along the coil so that, for example, it puts only half of the length of the heating coil into the circuit, the core and blade will receive heat and will rise in temperature at approximately half the previous rate, and the thermostat blade will take approximately twice as long as before to reach the position in which the contacts are automatically separated to open the circuit. Thus the interval during which the heating pad receives energy will be approximately doubled, with a corresponding resulting increase in operating temperature of the heating pad or other appliance. As the slide is moved farther away from the "off" end, the contacts will be left closed for an increasingly longer period, with a corresponding higher temperature in the heating pad. When the slide is at the extreme end position opposite the off position, then only a slight amount of the heating coil will be included in the circuit and the blade will not reach a sufficiently high temperature to open the contacts, and as a result the heating pad will receive heat energy continuously, enabling a very high temperature to be built up therein.

The contact leaf 43 is normally held in a position to close the circuit owing to the fact that the thermostat blade when not subjected to heat normally occupies the position shown in Fig. 6, in which its outer end is bent slightly inward toward the heating coil. It will be observed from Fig. 6 that in this position the bail 49 is under tension and tends to pull the contact leaf 43 toward the right and to tip it in a clockwise direction, which movement is resisted by the bearing of the leaf against the rounded contact member 45. When the thermostat blade is heated its outer end moves upward (Fig. 6), thus pressing the leaf against contact 45 and moving the leaf in a counterclockwise direction so that the leaf comes into line with the thermostat blade, thus increasing the tension of bail 49. As this motion takes place, the leaf rubs along contact 45 and there is produced a wiping action which is very desirable for keeping the contact surfaces clean. When the leaf and thermostat blade come into line with each other, bail 49 is at its longest dimension and under greatest tension, and, as the leaf is tipped by further pressure against contact 45 in a counterclockwise direction, it passes the in-line position, at which time the force derived from the tension of the bail 49 reverses its direction with the consequence that the leaf is thrown with a sudden snap action away from contact 45 and over against the stop 44. The foregoing operations require a considerable movement of the thermostat blade, and, therefore, the complete cycle of the switch is not unduly short, and there is produced a relatively slow action at the contacts which, with the wiping action of the contacts, enables the mechanism to be used for a long period of time without requiring attention.

It is desirable that throughout the range of movement of the slide a shift of the slide through a given unit of length should cause substantially the same change of temperature range in the heating pad or other appliance. In practice this effect will not be produced if the heating coil be of the same cross-section throughout its length. If, for example, the entire range of movement of the slide be divided into eight equal spaces to give nine positions, and these positions be designated 0, 1, 2, 3, 4, 5, 6, 7, 8, the 0 position corresponding with the off position and the 8 position corresponding to the position of greatest heat developed in the pad or other appliance, it will be found that if the coil and core are of uniform section throughout their length, a change of the position of the slide from 1 to 4 will not cause as much change in heat developed in the pad as will be caused by moving the slide from 4 to 7. Similarly, there will not be as much developed heat change when the slide is moved from 1 to 2 as when it is moved from 2 to 3, nor as much change from 2 to 3 as there is from 3 to 4, and so on. In order to compensate for this condition, the coil and core are reduced in cross-section toward one end in the manner previously described. The effect of decreasing the coil resistance per unit of coil length so that it is less between points 2 and 3 than between points 1 and 2, and so on, in a coil of the form shown, will be to vary the time intervals during which the pad is in circuit in such a manner as to equalize the temperature changes in the appliance which are brought about by moving the slide a given distance at different parts of its range of movement. Although I find that in order to obtain the ideal conditions the core of the coil would increase in width along a spreading curve from point 8 to point 0, sufficiently satisfactory working results are produced by omitting the curve and providing a straight taper on the core, as shown more particularly in Fig. 8. This shape of core is easier to manufacture than a curved core and produces very satisfactory results.

Figure 5:
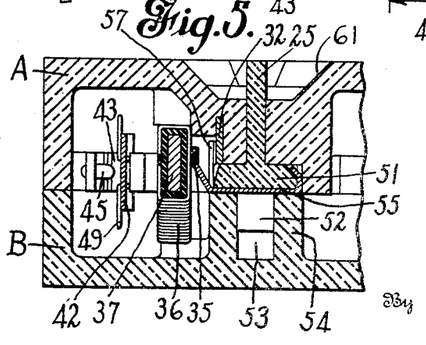
Fig. 5 is an enlarged fragmentary section taken on line 5—5 of Fig. 4.

It will be observed particularly from Fig. 5 that the tongue 25 on the slide member has its outer end substantially flush with the face of the switch casing. The slot 24 is preferably located at the bottom of a groove 61 in the face of casing member A. For the most part the outer face of casing member A is flat, but it has a depressed central median portion constituting the groove 61, and preferably the side and end walls of this depressed groove portion diverge upwardly and outwardly. By locating the projecting part of the slide member in this grooved portion the slide member is protected and accidental movement of the slide member in the slot caused by the tongue catching on bed clothes or the like is prevented or reduced to a minimum.

The slide member J is closely fitted in its guide in the casing and has such engagement with the conductor strip and with the coil 36 that while the slide can be moved with facility to the position in which the desired temperature in the appliance will be obtained, the slide member will maintain its position when once adjusted. When placed in a certain position in the slot, the slide member will not be dislocated under ordinary circumstances.

Figure 5A:
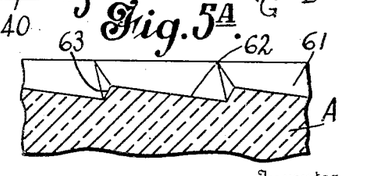
Fig. 5A is an enlarged detail section on line 5A—5A of Fig. 1.

It is desirable to be able to ascertain the position of the slide member in the dark. With this end in view the conformation of the depressed portion of the casing adjacent the projecting manipulating member is such that it is possible to ascertain by feeling whether the switch is in the on position or in the off position, and if in the on position, the degree of heat, approximately, for which the switch is set. I preferably achieve this result by forming the bottom of the grooved portion 61 as a series of steps. In the example shown, four steps are provided, but I do not limit myself to any particular number. These steps offer obstructions to the finger or thumb of the operator when the latter is moved in one direction, but when it is moved in the opposite direction the finger or thumb readily slides over the surface of the casing. In the particular form shown, the steps at the bottom of the groove have long gradually sloping treads or tops 62 and narrow abrupt risers 63, as shown in detail in Fig. 5A. In the particular case shown the risers 63 are encountered by the finger when the slide member is moved in a direction to increase the temperature of the heating pad, while if the slide is moved to decrease the temperature the finger encounters the tops or treads of the steps and readily slides over them. In this manner the position of the slide member and the direction in which it should be moved to obtain the desired results can be readily ascertained in the dark. Of course, the reverse of the described arrangement could be adopted if desired, that is, the risers of the steps could be encountered by the finger during the movement of the slide member in a direction to decrease the pad temperature, and other changes might be made without departing from the principle involved. For daytime use an arrow and suitable lettering, as shown for example in Fig. 1, indicate the proper direction of movement of the slide to obtain the desired temperature setting.

It will be noticed that the body of the slide member is substantially wider than the slot 24, and closes the slot at its lower margin. This body extends at right angles to the plane of the tongue and fits against the lower face of the casing section provided with a slot so as to exclude dirt or other material or objects from the interior of the switch.

Another advantage arises from the fact that the live parts of the switch are located to one side of the slot instead of directly under it. In this manner the live parts are well protected and there is no trouble from objects such as coins being inserted into the casing against the live parts by way of the slot.

It will be noted that as the thermostat blade is substantially parallel and opposite to the heating coil the length of the device is reduced to a minimum. On the other hand, the heating effect of the coil on the thermostat blade is very direct owing to the fact that the core of the coil is connected to the blade so as to conduct heat thereto. The coil heats the core and the heat of the core is conducted by an extension of the core body (which extension is preferably reversely turned) directly to the thermostat. In this manner a very prompt heating up of the thermostat blade follows the closing of the circuit by the movement of the slide member to the on position.

The interior of the switch casing is preferably formed with appropriate barriers, as shown in the drawings so as to reduce short circuits in the switch to a minimum.

By my improvements a very nice control of the temperature of the heating pad or other appliance can be obtained. At the same time, the control switch can be used very conveniently, the desired results as regards heating effect can be easily obtained, and the consumption of electric current is reduced. The switch is compact and of relatively simple structure.

Various changes can be made in the details of the device without departing from the scope of my invention. I have not attempted to describe the various modifications which may be made within the principle of my invention as defined in the claims.

What I claim is:

1. A control switch comprising a casing, two terminals adjacent each end of the casing, a make and break device located between and adapted to interconnect a terminal at one end of the casing and the corresponding terminal at the opposite end, a thermostat for operating said make and break device, a heating coil acting on the thermostat and arranged to be interposed in the circuit between said terminals when said make and break device is in circuit-making position, and manually operable means for cutting out more or less of the heating coil as desired, said heating coil being inactive when the circuit is open between said terminals.

2. In a control switch, an elongated casing, two terminals adjacent each end of the casing, one of said terminals being permanently in circuit with the corresponding terminal at the opposite end of the switch casing, a thermostatically operated make and break device located between the other terminals and including a heating coil and a thermostat element subject to the heat thereof, and a manually operated slide member in the casing adapted to cut out more or less of the heating coil.

3. A control switch comprising a hollow casing made in sections applied face to face, a slide member in the casing having a part projecting out of a slot in one of said sections, a heating coil in the casing controlled by said slide to generate more or less heat, circuit terminals in the casing, and a thermostatically operated make and break device in the circuit influenced by said heating coil.

4. A control switch including a hollow casing made in sections clamped together, a slide in said casing having a tongue projecting out of a slot in one of the casing sections, a thermostatic make and break device in the switch casing, and a heating coil influencing said make and break device and controlled by said slide.

5. In a control switch, a casing, circuit terminals therein, a conductor strip extending from one terminal in the direction of the other, a slide member movable along said conductor strip, a heating coil arranged to have a variable number of its turns inserted into the circuit by adjustment of said slide, and a thermostatic make and break device in the circuit subject to the heating action of said coil.

6. In a control switch, a switch casing, circuit terminals in said casing, a conductor strip extending from one of said terminals toward the other, a slide movable along said conductor strip, a heating coil contacted by said slide, a core within said coil, and a thermostat blade connected to said core, said blade being adapted to open and close the circuit.

7. In a control switch, a switch casing, circuit terminals in said casing, a conductor strip extending from one of said terminals toward the other, a slide movable along said conductor strip, a heating coil contacted by said slide, a core within said coil, and a thermostat blade connected to said core, said blade being adapted to open and close the circuit and said blade being located opposite and close to the coil.

8. In a control switch, a switch casing, circuit terminals adjacent the respective ends of the casing, a conductor strip extending from one terminal toward the other, a slide member movable along said conductor strip, a heating coil whose turns are adapted to be contacted by said slide member, a core for said coil projecting out of the end thereof and reversely turned, and a thermostat blade secured to the reversely turned portion of the coil core and opposite the coil, said thermostat blade being adapted to close and open the circuit between said terminals.

9. In a device such as described, a casing, a manually operable slide member movable lengthwise of said casing, a pair of terminals at each end of the casing, a slide having a manipulating tongue projecting out through a slot in the casing and adapted to be moved lengthwise of the casing, a heating coil adapted to be contacted by said slide to insert a variable number of coil turns in the circuit between a terminal at one end of the switch and a terminal at the opposite end, a thermostatic device influenced by said heating coil, and means operable by said thermostatic device to close the circuit between said terminals.

10. In a device such as described, a casing, a manually operable slide member movable lengthwise of said casing, a pair of terminals at each end of the casing, a slide having a manipulating tongue projecting out through a slot in the casing and adapted to be moved lengthwise of the casing, a heating coil adapted to be contacted by said slide to insert a variable number of coil turns in the circuit between a terminal at one end of the switch and a terminal at the opposite end, a thermostatic device influenced by said heating coil, means operable by said thermostatic device to close the circuit between said terminals, said slide having an off position in which the circuit is interrupted, and means for holding said slide against accidental dislodgment when in the off position.

11. In a device such as described, a casing, spaced terminals in said casing, a conductor strip extending from one terminal toward the other, a make and break device adjacent the other terminal, a thermostatic element operating said make and break device, a heating coil influencing the thermostatic element, a lengthwise movable manual manipulating member mounted in the casing and projecting therefrom, said member adapted to open the circuit and to close the circuit with a variable number of heating coil turns in the circuit.

12. In a device such as described, the combination of a conductor strip, a slide movable along said strip, a heating coil opposite the strip adapted to be contacted by the slide, a thermostat element, means operated by said element to close the circuit including said conductor strip, and means for conducting heat from the interior of said coil to one end of said thermostat element.

13. In a device such as described, a conductor strip, a slide member movable along said strip, a heating coil adapted to be contacted by said slide member, a core for said coil, a thermostat blade mounted alongside and close to said heating coil, a core member extending from the inside of the coil to the outside thereof at one end of the coil and reversely turned and secured to said thermostat blade, and means actuated by the thermostat blade to open and close the circuit.

14. In a device such as described, an elongated casing having a flat face, the median portion of the flat face of said casing being depressed, the bottom of the depressed portion communicating with a slot which extends within the casing, a slide in the casing having a tongue projecting out of said slot into said depressed portion, and a thermostatically operated make and break device in the case controlled by said slide.

15. In a device such as described, a casing having a recessed stepped portion extending along one face thereof, and a slide member having a projecting part movable in and along said stepped portion.

16. In a device such as described, a casing having circuit terminals therein, a conductor strip extending from one terminal toward the other, a slide having a tongue projecting out of a longitudinal slot in the casing, a metallic member on said slide contacting with said conductor strip, a projecting part on said metallic member adapted to contact with the turns of a heating coil, a heating coil extending alongside said conductor strip contacted by said part, a conductor element projecting from the other terminal having a fixed contact, and a thermostat device influenced by said heating coil having a movable part to cooperate with said fixed contact.

17. In a device such as described, a casing having a grooved portion in one face with a slot at the bottom of the groove, the bottom of the groove being formed to present steps at the side of the slot, said steps having long gradual tops or treads and abrupt risers, and a movable member within the switch casing having a part projecting out of said slot adjacent said steps.

18. A device such as described comprising a casing having a longitudinally extending recess with a slot communicating with the interior of said casing, a tongue projecting exteriorly of said slot for manual manipulation, a slide member in the casing movable by means of said tongue, means in the casing for obtaining different effects as the slide member is moved in the respective directions in its slot, and means disposed in said recess and located so as to be engaged by the finger moving the tongue during such movement for indicating in the dark which of two effects will be produced by moving the slide member in a given direction from the position in which it is located.

19. A device such as described comprising a casing having a longitudinally extending slot, a tongue projecting exteriorly of said slot for manual manipulation, a slide member in the casing movable by means of said tongue, means in the casing for obtaining different effects as the slide member is moved in the respective directions in its slot, and means associated with the casing for indicating in the dark which of two effects will be produced by moving the slide member from the position in which it is located, said means including a series of steps extending alongside the slot and having long gradually inclined tops and abrupt narrow risers, said risers facing toward one end of the casing.

20. A device such as described comprising a casing having a longitudinally extending slot, a tongue projecting exteriorly of said slot for manual manipulation, a slide member in the casing movable by means of said tongue, means in the casing for obtaining different effects as the slide member is moved in the respective directions in its slot, and means associated with the casing for indicating in the dark which of two effects will be produced by moving the slide member from the position in which it is located, said means including a series of steps extending alongside the slot and having long gradually inclined tops and abrupt narrow risers, said risers facing toward one end of the casing, said steps being located in a groove in the casing having flaring sides and said tongue being substantially flush with the casing.

21. In a device such as described, a casing, terminals in said casing adjacent the respective ends, a conductor strip extending from one terminal toward the other, a slide movable along said conductor strip, a heating coil contacted by said slide, a core for said coil, a stationary stop projecting from one end portion of the core, a conductor strip extending from the other terminal and having a fixed contact facing toward said stop, a contact leaf movable between said fixed contact and said stop, and a thermostat element connected with said leaf and under the influence of said coil.

22. In a device such as described, a heating coil, a thermostat blade located substantially opposite said coil and close to the same, means for fixedly supporting one end of said thermostat blade, a leaf having hinged relation to the opposite end of said blade, a bail carried by and supported on said blade for maintaining said leaf in its hinged relation to the blade, a contact adapted to be contacted by said leaf to close the circuit when the leaf is swung to one side of the blade, and a fixed stop contacted by the leaf when it is swung oppositely with respect to the blade.

23. In a device such as described, a thermostat blade fixed at one end and movable at the opposite end, a contact leaf having a grooved end engaging the free end of the blade, a bail supporting said leaf from the blade and engaging a groove at the free or outer end of the leaf, and a fixed contact against which one side of the leaf impinges when the blade attains a predetermined temperature.

24. In a control switch for heating appliances, a heating coil, a thermostatic device influenced thereby for making and breaking the circuit, and a slide member for cutting the coil into and out of the circuit so as to vary the input of energy into the heating appliance, said coil decreasing in cross-section toward one end.

25. In a control switch for heating appliances, a heating coil, a thermostatic device influenced thereby for making and breaking the circuit, a slide member for cutting the coil into and out of the circuit so as to vary the input of energy into the heating appliance, and a metallic core for said coil to which the thermostatic device is directly connected so as to receive heat conducted by the core.

26. A control switch for heating appliances comprising a casing having provisions for securing duplex conductor cords to the respective ends thereof, a movable control member projecting exteriorly of the casing for manual manipulation, said member having at one end of its movement an "off" or open circuit position, thermoresponsive circuit-closing means in said casing, and control means for said circuit-closing means comprising a heating coil and a heating coil contacting member movable by and with said movable control member for establishing the circuit for an increasingly long period as said control member is progressively moved away from said "off" position.

27. In a control switch, a heating coil, a thermostat blade supported adjacent said coil, said blade being fixed at one end and movable at the opposite end, a contact leaf engaging the movable end of the blade, means supporting said contact leaf upon said blade end so that it has hinged relation thereto, said means tending to swing the leaf to one side of the blade when it is alined therewith, a fixed contact with which the leaf cooperates to close the circuit, said leaf normally contacting with said fixed contact when the blade is cool, a fixed stop with which said leaf contacts when the blade is heated to a predetermined degree, said fixed contact being in circuit with said heating coil, and adjustable means for varying the heating effect of sa'd coil upon said blade.

28. A control switch for heating appliances, comprising a casing having provisions for the attachment of conductors, a movable member projecting exteriorly of the casing for manual manipulation, and devices in the casing including a heating coil cooperating with said member so that as it is progressively moved away from a predetermined position it establishes the circuit for a period which progressively increases in length, said devices being constructed so that throughout its range of movement said movable member changes the heating effect of the appliance substantially uniformly.

29. A control switch for heating appliances, comprising a casing of insulating material made in sections applied face to face, one of said sections having a slot extending lengthwise of its outer face, a slide member mounted and guided between the casing sections to slide lengthwise of the casing and having a manipulating tongue projecting out of said slot, and devices in the casing including a heating coil cooperating with said slide member so that as it is progressively moved in one direction relatively to said slot it establishes the circuit for a period which progressively increases in length.

30. A control switch for heating appliances, comprising a casing of insulating material made in sections applied face to face, one of said sections having a slot extending lengthwise of its outer face, a slide member mounted and guided between the casing sections to slide lengthwise of the casing, said slide member having a body portion extending substantially at right angles to the plane of said slot so as to close the slot from the exterior, a tongue on the slide member projecting out of said slot for manual manipulation, and devices in said casing cooperating with said slide member for maintaining the circuit closed for variable lengths of time according to the position of the slide member in the casing.

31. In a control switch, a casing, two terminals adjacent each end of the casing, means in the casing providing a through connection for current from one of said terminals to the corresponding terminal at the opposite end of the casing, a thermostatically operated make and break device located between the other terminals and including a heating coil and a thermostat element subject to the heat thereof, said casing being constructed of hollow sections of insulating material applied face to face, and a manually movable member mounted in the casing adapted to cut out more or less of the heating coil.

32. A control switch for heating appliances comprising a casing having a slot extending longitudinally thereof, a slide member mounted and guided in the casing to move lengthwise thereof and having a manipulating tongue projecting out of said slot, and a thermostatic device in the casing including a heating coil and a thermostat bar cooperating with said slide member so that as it is progressively moved in one direction in said slot it establishes the circuit for periods of different lengths, said heating coil and thermostat bar being offset laterally with respect to said slot so as to lie at one side thereof.

33. In a control switch, a casing having a longitudinal slot occupying a substantially median position at one face of the casing, two terminals within each end of the casing, means in the casing laterally offset from said slot providing a through connection for current from one of said terminals to the corresponding terminal at the opposite end of the casing, a thermostatically operated make and break device located between the other terminals and at the opposite side of said slot, and a manually operable member guided in said slot and adapted to control said thermostatically operated make and break device.

34. In a control switch, a casing having a longitudinal slot in the face thereof, pairs of terminals adjacent the respective ends of the casing, one of the terminals of each pair being at one side of the slot and the other terminal of said pair being at the opposite side of the slot, means providing a through connection between two terminals located at the same side of the slot, a thermostatic device comprising a heating coil and blade located on the opposite side of the slot, between the other terminals, and a controlling member for the thermostatic device movable in the slot.

35. A control switch for electric appliances comprising a casing having a slot, a slide member in the slot, and devices in the casing including a heating coil and thermostat bar cooperating with said slide member to establish heating periods of different length by adjustment of the slide member in the slot, the live parts of said switch being disposed in said casing laterally of said slot and out of registry therewith.

36. In a thermostatically controlled switch, a support, a U-shaped member mounted on said support, one leg of said U-shaped member being fixed to said support and the other leg free therefrom, one of said legs being formed of a bi-metal element and the other having a heating coil wound thereon, said free leg being adapted upon movement induced by the heating effect of said heating coil to make and break a circuit.

37. In a thermostatically controlled switch, a support, a U-shaped member mounted on said support, one leg of said U-shaped member being fixed at its end to said support and the other leg free therefrom, the second-mentioned leg being formed of a bi-metal element and the first having a heating coil wound thereon, said free leg being adapted upon movement induced by the heating effect of said heating coil to make and break a circuit, and means to vary the resistance of said heating coil to change the degree of heat developed thereby.

38. A device such as described, comprising a casing having a longitudinally extending slot, a tongue projecting exteriorly of said slot for manual manipulation, a slide member in the casing movable by means of said tongue, means in the casing for obtaining different effects as the slide member is moved in the respective directions in its slot, and means associated with the casing and comprising a series of members formed as steps adapted to be engaged by the finger moving the tongue during such movement for indicating in the dark which of two effects will be produced by moving the slide member in a given direction.

39. A device such as described, comprising a casing having a longitudinally extending slot, a tongue projecting exteriorly of said slot for manual manipulation, a slide member in the casing movable by means of said tongue, means in the casing for obtaining different effects as the slide member is moved in the respective directions in its slot, and means associated with the casing and comprising a series of similar members located immediately adjacent the slot at both sides thereof and over which the tongue moves, said members being adapted to be engaged by the finger in moving the tongue and shaped for indicating in the dark which of two effects will be produced by moving the slide member in a given direction.

40. A device such as described comprising a casing, a thermostatic make-and-break device in the casing comprising a thermostat blade, a heating coil located alongside the blade to heat the same, a reversely turned core member having one leg thereof within said coil and connected to said blade for conveying heat generated by the coil to the blade, and means for cutting a variable number of turns of the coil into the circuit.

41. A device such as described, comprising a casing, a thermostatic make-and-break device in the casing comprising a thermostat blade, a heating coil, a member supporting the blade and extending into the coil adapted to carry heat by conduction from the interior of the coil to the blade, said member having a portion bent reversely exteriorly of the coil so as to lie substantially parallel with the coil, and said portion being connected to said blade, and means for adjusting the heating effect of the coil.

42. In a control switch, a casing, two terminals adjacent each end of the casing, one of said terminals being connected to the corresponding terminal at the opposite end of the switch casing, and a thermostatically operated make-and-break device comprising a conductor strip, a slide member, a heating coil, and a thermostat blade, interposed between the other terminals.

43. In a control switch, a casing, two terminals adjacent each end of said casing, one of said terminals being connected to the corresponding terminal at the opposite end of the casing, a make-and-break contact device adjacent one of the other terminals and between it and the fourth terminal, a thermostat blade cooperating with said contact device to actuate it, a heating coil influencing said blade, and means for connecting a variable number of the coil turns in circuit with the thermostat blade and fourth terminal, said last-named means and said blade on opposite sides respectively of said coil.

44. A control device for an electrical heating appliance having a power circuit, said control device being separate from said appliance and having a casing and being interposed in said circuit, said device comprising a heating coil, a thermostatic device influenced thereby for making and breaking the circuit of said appliance, and a slide member movable along and projecting exteriorly from the casing of said control device and adapted to cut portions of said coil into and out of the circuit so as to vary the time interval during which energy is supplied to said appliance, said coil being active when the circuit is closed and inactive when it is open and of varying resistive effect lengthwise of the coil so that throughout its range of movement said slide varies the temperature of the appliance uniformly in conformity with the extent to which the slide is moved.

45. In a control switch for heating appliances, a heating coil, a thermostatic device in series with said coil influenced thereby for making and breaking the circuit, and a manually movable member for cutting portions of the coil into and out of the circuit, said coil being of different resistive effect at different points in its length and said movable member being operable to vary the heating effect of the appliance to the same degree upon a given movement of said member anywhere in its range.

46. In a control switch, a switch casing, terminals in said casing, a conductor strip extending from one of said terminals toward the other, a slide movable along said strip, a heating coil disposed alongside said strip and contacted by said slide, a core within said coil, and a thermostatic make-and-break device in series with said coil including a blade mounted upon and thermally connected with said core.

WALTER R. WEEKS.